COMBINED OPTICAL AND ELECTRONIC CIRCUIT DEVICES

Filed Dec. 3, 1959 2 Sheets-Sheet 1

INVENTORS
THOMAS R. NISBET
ALAN J. HEEGER
KEITH R. MORSETTE
BY George C. Sullivan
Agent INVENTORS
THOMAS R. NISBET
ALAN J. HEEGER
KEITH R. MORSETTE
BY George C. Sullivan
Agent 3,034,011
Patented May 8, 1962

3,034,011
COMBINED OPTICAL AND ELECTRONIC CIRCUIT DEVICES

Thomas R. Nisbet, Palo Alto, Alan J. Heeger, Berkeley, and Keith R. Morsette, San Carlos, Calif., assignors to Lockheed Aircraft Corporation, Burbank, Calif.

Filed Dec. 3, 1959, Ser. No. 857,195
14 Claims. (Cl. 313—108)

This invention relates to combined optical and electronic circuit devices in which electroluminescent, photoconductive and thermistor elements are employed as circuit components.

It is well known that optical phenomena can potentially be combined with electronic circuitry to provide a wide variety of electronic circuit functions now obtained using only conventional electronic components. Perhaps one of the most attractive features to be obtained by combining the field of optics with electronic circuitry is the possibility of achieving a high degree of miniaturization using relatively low cost optical components. Although the potential of this combination of optics and electronic circuitry has been known for some time, the lack of suitable materials and techniques has prevented the development of practical circuitry.

Accordingly, it is the broad object of this invention to provide combined optical and electronic circuitry which is adaptable for practical use with present day materials.

Another object of this invention is to provide new types of combined optical and electronic circuitry employing electroluminescent, photoconductive and thermistor elements as circuit components.

More specific objects of this invention are to provide an optical pulse-stretching circuit, an optical differentiating circuit, an optical oscillator and an optical flip-flop circuit employing electroluminescent, photoconductive and thermistor elements as circuit components.

An additional object of this invention is to provide devices in accordance with the aforementioned objects which are capable of being made in simple and compact form at relatively low cost.

We have discovered that, by employing one or more thermistor elements in combination with electroluminescent and photoconductive elements, it is possible to greatly increase the versatility of circuit operation obtainable. As a result, we have been able to devise novel forms of optical circuitry which heretofore were not possible, or else, required considerably greater circuit complexity. The specific nature of the invention, as well as other objects, uses, and advantages thereof, will clearly appear from the following description and from the accompanying drawing in which.

Like numerals designate like elements throughout the figures of the drawing.

Before the optical circuit devices devised in accordance with this invention are described in detail, it will now be pointed out that electroluminescent, photoconductive and thermistor elements, each by themselves, are well known in the art, and can be provided in a variety of well known forms. Also, electroluminescent and photoconductive elements have been mutually employed, with or without optical coupling therebetween, in a variety of forms which are also well known to those skilled in the art. For this reason, the details of construction and design of these elements in the circuits to be described will not be given in detail. However, considering the state of development of these elements in the art, the description and operation which is given will be entirely sufficient to enable those skilled in the art to provide the necessary construction and arrangement of the electroluminescent, photoconductive and thermistor elements which will produce the operation described in connection with each circuit.

Figure 1:
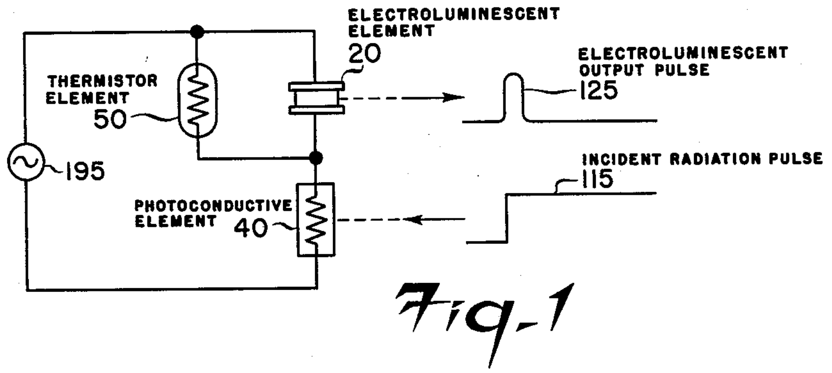
FIGURE 1 is a schematic and circuit diagram of an optical differentiating circuit, in accordance with the invention.

In FIGURE 1, which illustrates the circuit diagram of an optical differentiating circuit, the parallel combination of an electroluminescent element 20 and a thermistor element 50 is connected in series with a photoconductive element 40 across an A.-C. energizing voltage source 195. In the circuit of FIGURE 1, unlike the other circuits to be described, no optical coupling is provided between the electroluminescent and photoconductive elements 20 and 40.

The electroluminescent, photoconductive and thermistor elements 20, 40 and 50 in FIGURE 1 are chosen in conjunction with the voltage of the source 195, so that for negligible incident radiation on the photoconductive element 40, the high dark impedance thereof prevents a sufficient voltage from appearing across the electroluminescent element 20 to cause luminescence thereof. The circuit of FIGURE 1 is further constructed and arranged so that when sufficient incident radiation is applied to the photoconductive element 40 as indicated at 115, its impedance will be reduced to an extent which will initially cause luminescence of the electroluminescent element 20 as a result of the increased voltage thereby appearing thereacross. This increased voltage across the electroluminescent element 20 also appears across the thermistor element 50 in parallel therewith, increasing the current flow therethrough and causing the thermistor element 50 to heat up. The thermistor element 50 is chosen to have an initial impedance and a negative temperature coefficient of resistivity so that, as it gradually heats up, its impedance reduces until an equilibrium circuit condition is achieved at which the impedance of the "hot" thermistor element 50 is at a sufficiently reduced value to prevent the electroluminescent element 20 from luminescing in the presence of the incident radiation 115 on the photoconductive element 40. As long as the incident radiation 115 is present, the equilibrium condition remains with the electroluminescent element 20 dark. When the incident radiation pulse 115 ceases, the thermistor element 50 begins to grow cold and its impedance slowly rises. However, since the photoconductive element 40 returns to its high dark impedance at a much faster rate, the electroluminescent element 20 remains dark when the incident radiation is removed.

It will thus be seen that the circuit of FIGURE 1 produces an electroluminescent output pulse 125 of predetermined duration in response to the application of a much longer incident radiation pulse of non-critical duration. Effectively, therefore, the circuit of FIGURE 1 acts as an optical differentiating circuit, except that no pulse of light is produced when the incident radiation ceases. The duration of the electroluminescent output pulse 125 will be dependent upon the time constants involved in the circuit. Since the response of the thermistor element is ordinarily much slower than that of the electroluminescent and photoconductive elements 20 and 40, its time constant primarily determines the duration of the electroluminescent output pulse 125. The duration of the output pulse 125 may conveniently be varied by varying the voltage of the source 195.

In a typical embodiment of the circuit of FIGURE 1, the following commercially available elements are employed: a Sylvania 2" x 1" zinc sulphide phosphor electroluminescent element is employed as the electroluminescent element 20, a Radio Corporation of America (RCA) cadmium sulfide photoconductive element of approximately the same area is employed as the photoconductive element 40, and a thermistor having a resistance of 200,000 ohms at 25° centigrade, a dissipation constant of 0.7 milliwatt per degree centigrade, a temperature coefficient of resistivity of −4% per degree centigrade at 25° and a thermal time constant of three seconds is employed as the thermistor element 50. An A.-C. voltage of 200 volts R.M.S. at 1,000 cycles per second is used as the A.-C. energizing source 195. In such a typical circuit, an output electroluminescent pulse of one-half second duration is obtained at the start of a long incident radiation pulse applied to the photoconductive element 40, and upon cessation of this incident radiation pulse, the electroluminescent element remains dark. It is to be understood that this typical embodiment, and those to be described in connection with later circuits, are presented only for illustrative purposes, and in no way should be considered as limiting the scope of this invention.

Figure 2:
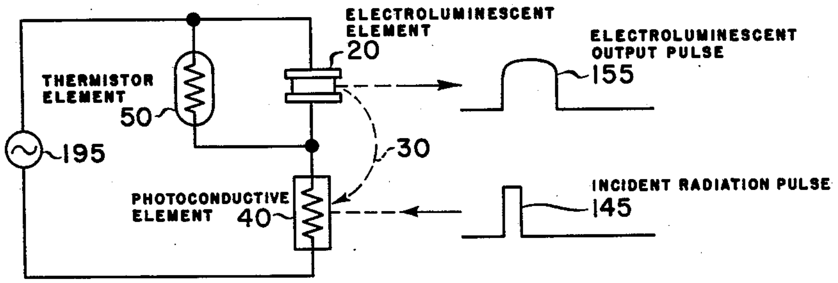
FIGURE 2 is a schematic and circuit diagram of an optical pulse-stretching circuit, in accordance with the invention.

Instead of obtaining optical differentiation, as in the circuit of FIGURE 1, it is also possible to provide optical pulse-stretching by means of the circuit shown in FIGURE 2. The circuit of FIGURE 2 is basically the same as that of FIGURE 1, except that sufficient optical coupling is provided between the electroluminescent and photoconductive elements 20 and 40 (as indicated by the dashed arrow 30) to produce bistable operation of the circuit. That is, the electroluminescent element 20 will be in either of two states, namely either dark or luminescent at its saturation brightness level, depending upon whether or not the photoconductive element 40 has an incident radiation applied thereto which is greater than a predetermined critical level. For purposes of the description herein and the appended claims, the electroluminescent element will be referred to as "off" when in the dark state and "on" when in the luminescent state. Bistable operation of an electroluminescent element and a photoconductive element optically-coupled thereto is well known in the art and has been employed in a number of devices. (For example, see Patent No. 2,818,511, column 3, lines 27–65.)

The circuit of FIGURE 2 is constructed and arranged so that if the incident radiation applied to the photoconductive element 40 is below a critical level, the electroluminescent element remains dark in the "off" state, but if the incident radiation is greater than this critical level the electroluminescent element 20 regeneratively builds up to the saturation brightness level of the "on" state, the voltage thereacross increasing accordingly. Once this regenerative build-up begins, operation will continue even though the incident radiation is removed. An applied incident radiation pulse such as 145, therefore, need only be present until the regenerative build-up process becomes irreversible.

As in the FIGURE 1 embodiment, the increased voltage appearing across the electroluminescent element 20 when it is luminescent in its "on" state also appears across the thermistor element 50 in parallel therewith, causing it to heat up. The thermistor element 50 is now chosen to have an initial impedance and a negative coefficient of resistivity, so that the increased voltage thereacross when the electroluminescent element 20 becomes luminescent, causes the thermistor element to heat up to an extent where the decrease in its impedance so lowers the voltage across the electroluminescent element that it switches back to its "off" state. Since the short incident radiation pulse 145 has long since been removed, the electroluminescent element 20 remains "off."

It will thus be evident from the above description that the circuit of FIGURE 2 provides a relatively long electroluminescent output pulse 155 in response to a relatively short incident radiation pulse 145 whose duration is noncritical as long as it is present for the minimum time required to initiate switching of the electroluminescent element 20 to its "on" state. Effectively, therefore, the circuit of FIGURE 2 performs an optical pulse-stretching operation. As was the case for the FIGURE 1 circuit, duration of the output pulse 155 is dependent primarily on the response time of the thermistor element 50.

In a typical embodiment of the circuit of FIGURE 2, the electroluminescent and photoconductive elements 20 and 40 are the same as in the typical embodiment described in connection with FIGURE 1. Optical coupling as indicated at 30 is obtained by placing the rectangular electroluminescent element substantially in contact and coincident with the photoconductive element which is approximately the same size. The thermistor element 50 employed has a resistance of 200,000 ohms at 25° centigrade, a dissipation constant of 5 milliwatts per degree centigrade, a temperature coefficient of resistivity of −4% per degree centigrade at 25° and a thermal time constant of about three seconds. An A.-C. voltage of 250 volts R.M.S. at 500 cycles per second is used as the A.-C. energizing source 195. In such an embodiment a relatively short incident radiation pulse of one-tenth to two seconds produces a constant output pulse of approximately five-second duration.

Figure 3:
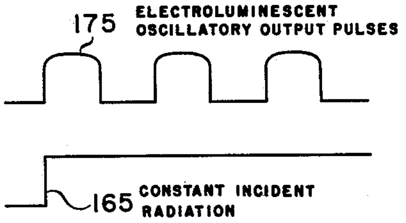
FIGURE 3 is a graph showing input and output curves for operation of the circuit diagram of FIGURE 2 as an optical oscillator.
Figure 4:
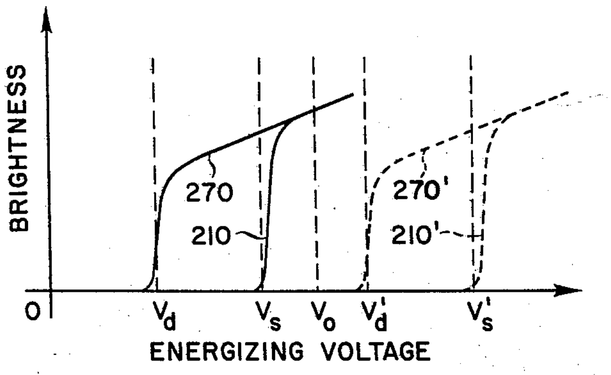
FIGURE 4 is a graph used in describing the operation of the circuit of FIGURE 2.

If instead of applying a relatively short incident radiation pulse to the photoconductive element 40 of FIGURE 2 as shown at 145, a constant incident radiation as shown at 165 in FIGURE 3 is applied, it will be found that the circuit of FIGURE 2 will then oscillate producing periodic pulses of relatively constant duration as illustrated by the electroluminescent oscillatory output pulses 175 in FIGURE 3. This occurs because of the inherent operating characteristics of an electroluminescent and photoconductive element arrangement, such as shown in FIGURE 2, in which the elements have sufficient optical coupling therebetween to produce bistable operation. FIGURE 4 is a graph showing typical characteristic curves for such an electroluminescent and photoconductive element arrangement. This graph will also be helpful in better understanding the operation of FIGURE 2 as an optical pulse-stretching circuit, as just described.

The graph of FIGURE 4 is a plot of the brightness of the electroluminescent element 20 vs. the energizing voltage from the source 195 for two conditions of operation. Considering first the solid line curve 270, it will be seen that as the energizing voltage is increased from zero the electroluminescent element remains substantially dark, or in the "off" state until a start voltage $V_s$ is reached, at which time the electroluminescent element turns "on" rapidly building up to a relatively large brightness level. As the energizing voltage is increased beyond $V_s$, the brightness gradually increases at a relatively low rate in accordance therewith. If the energizing voltage is now reduced, the brightness of the electroluminescent element reduces at this same low linear rate and continues to do so for a considerable range below the start voltage $V_s$, as shown by the upper portion of the curve 270. It will be understood that the electroluminescent element 20 does not turn "off" when the energizing voltage is reduced below $V_s$, because of the optical coupling between the electroluminescent and photoconductive elements which tends to maintain the electroluminescent element in its "on" state. If the energizing voltage continues to be reduced, a drop-out voltage $V_d$ will eventually be reached at which the electroluminescent element 20 rapidly becomes dark, and returns to the "off" state. The rapid increase in the brightness of the electroluminescent element when it is turned "on" at $V_s$ and the rapid fall of brightness at $V_d$ when it is turned "off" is caused by the regenerative action produced by the optical coupling.

The position of the curve 270 in FIGURE 4 is dependent upon the impedance of the photoconductive elements 40 and 50, which produce opposite effects. Decreasing the impedance of the photoconductive element 40 shifts the curve 270 to the left, and vice versa, while decreasing the impedance of the thermistor element shifts the curve 270 to the right, and vice versa. If the start voltage $V_s$ of the curve is greater than a fixed circuit energizing voltage $V_o$ so as to place it to the left of the $V_o$ line in FIGURE 4, the electroluminescent element 20 will be "on." On the other hand, if the drop-out voltage of the curve is less than the fixed circuit energizing voltage $V_o$ so as to place it to the right of the $V_o$ line as indicated by $V_d'$ in the dotted curve 270', the electroluminescent element 20 will be "off." If the $V_o$ line is between the start and drop-out voltages (this condition is not shown in FIGURE 4), the electroluminescent element 20 will either be "on" or "off," depending upon its last state.

In FIGURE 2, the circuit is adjusted so that in the absence of radiation applied to the photoconductive element 40, the characteristic curve is in a position such that its start voltage is greater than the fixed energizing voltage $V_o$ from the source 195. In order to avoid critical operation of the circuit, the curve is preferably chosen significantly to the right of the $V_o$ line, as shown by the dotted curve 270' in FIGURE 4, where both its start $V_s'$ and drop-out $V_d'$ voltages are greater than $V_o$. The application of sufficient incident radiation then decreases the impedance of the photoconductive element 40 to a point where the characteristic curve is shifted sufficiently to the left, as illustrated by the solid-line curve 270, so that the fixed energizing voltage $V_o$ is greater than the start voltage $V_s$, thereby turning the electroluminescent element "on." The brightness of the electroluminescent element in the "on" state is determined by the intersection of the $V_o$ line and the characteristic curve 270 as shown at 210.

When the electroluminescent element 20 turns "on," an increased voltage appears across the thermistor element 50, causing it to heat up and decrease its impedance by an amount which shifts the curve 270 sufficiently to the right so that the fixed energizing voltage $V_o$ is less than the drop-out voltage $V_d$, as shown by the dotted curve 270'. The electroluminescent element will thereby be turned "off" again, the duration of the "on" state depending primarily on the response time of the thermistor element 50.

In the operation of the circuit of FIGURE 2 as a pulse-stretcher, the incident radiation pulse 145, is present for only a relatively short time. Thus, even though the thermistor element 50 cools, gradually returning to its initial impedance value, the characteristic curve will remain significantly to the right of the $V_o$ line so that $V_o$ is less than the start voltage, because the photoconductive element 40 will long ago have returned to its high dark impedance value shortly after the incident radiation pulse 145 is removed. The electroluminescent element 20, therefore, remains "off" until another incident radiation pulse such as 145 appears, whereupon the cycle just described will be repeated.

It will now be understood that if the incident radiation pulse were to remain indefinitely as shown by the constant incident radiation 165 of FIGURE 3, the impedance of the thermistor element 50 will eventually increase to an extent where the characteristic curve shifts sufficiently to the left so that the start voltage $V_s$ is again less than the energizing voltage $V_o$. The electroluminescent element 20 will then switch over again to its "on" state, and the cycle will automatically repeat itself oscillating periodically with a pulse duration and repetition rate dependent upon the response time and characteristics of the circuit.

Figure 5:
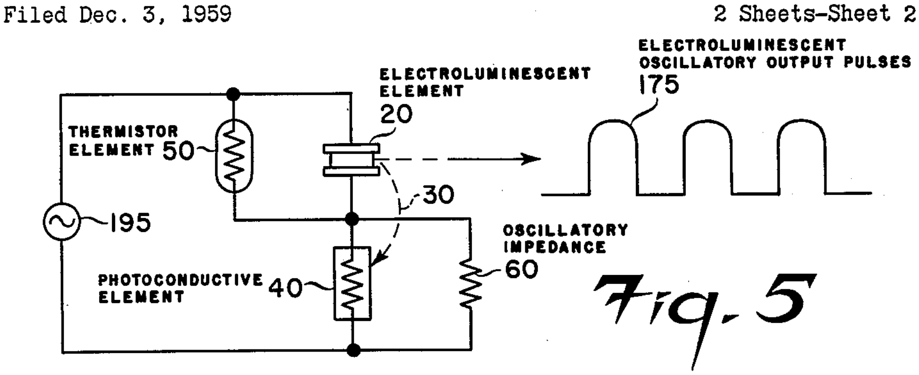
FIGURE 5 is a schematic and circuit diagram of an optical oscillator, in accordance with the invention.

In FIGURE 5, an optical oscillator is shown which requires no incident radiation in order to provide oscillation as did the circuit of FIGURE 2. This is accomplished in the circuit of FIGURE 5, which may be essentially the same as that of FIGURE 2, by providing an oscillatory impedance 60 in parallel with the photoconductive element 40. If desired, the photoconductive element 40 may then be completely shielded from any external incident radiation, radiation being received only from the electroluminescent element 20.

In order to obtain oscillation, the oscillatory impedance 60 is chosen sufficiently small so that the initial position of the characteristic curve is to the left of the $V_o$ line with its start voltage $V_s$ less than $V_o$ as shown by the solid-line curve 270 in FIGURE 4. In effect, therefore, the oscillatory impedance 60 performs the same function as did the application of external incident radiation to the photoconductive element 40 in FIGURE 2; that is, both cause the characteristic curve to initially be to the left of $V_o$ so that the start voltage $V_s$ is less than $V_o$, thereby permitting the electroluminescent element 20 to be turned "on." Thus, oscillatory operation of the circuit of FIGURE 5 will be the same as just described for continued incident radiation applied to the circuit of FIGURE 2.

In a typical embodiment of the circuit of FIGURE 5, the electroluminescent and photoconductive elements, the optical coupling therebetween, and the voltage output of the source 195 are the same as previously provided for the typical embodiment of FIGURE 2. The thermistor element 50 employed has a resistance of 300,000 ohms at 25° centigrade, a dissipation constant of 5 milliwatts per degree centigrade, a temperature coefficient of resistivity of —4% per degree centigrade at 25°, and a thermal time constant of about three seconds. Using an oscillatory impedance 60 of approximately 300,000 ohms, an output oscillation at the rate of one cycle per every five seconds is obtained, the duration of each oscillation pulse being about two seconds.

Figures 6, 7:
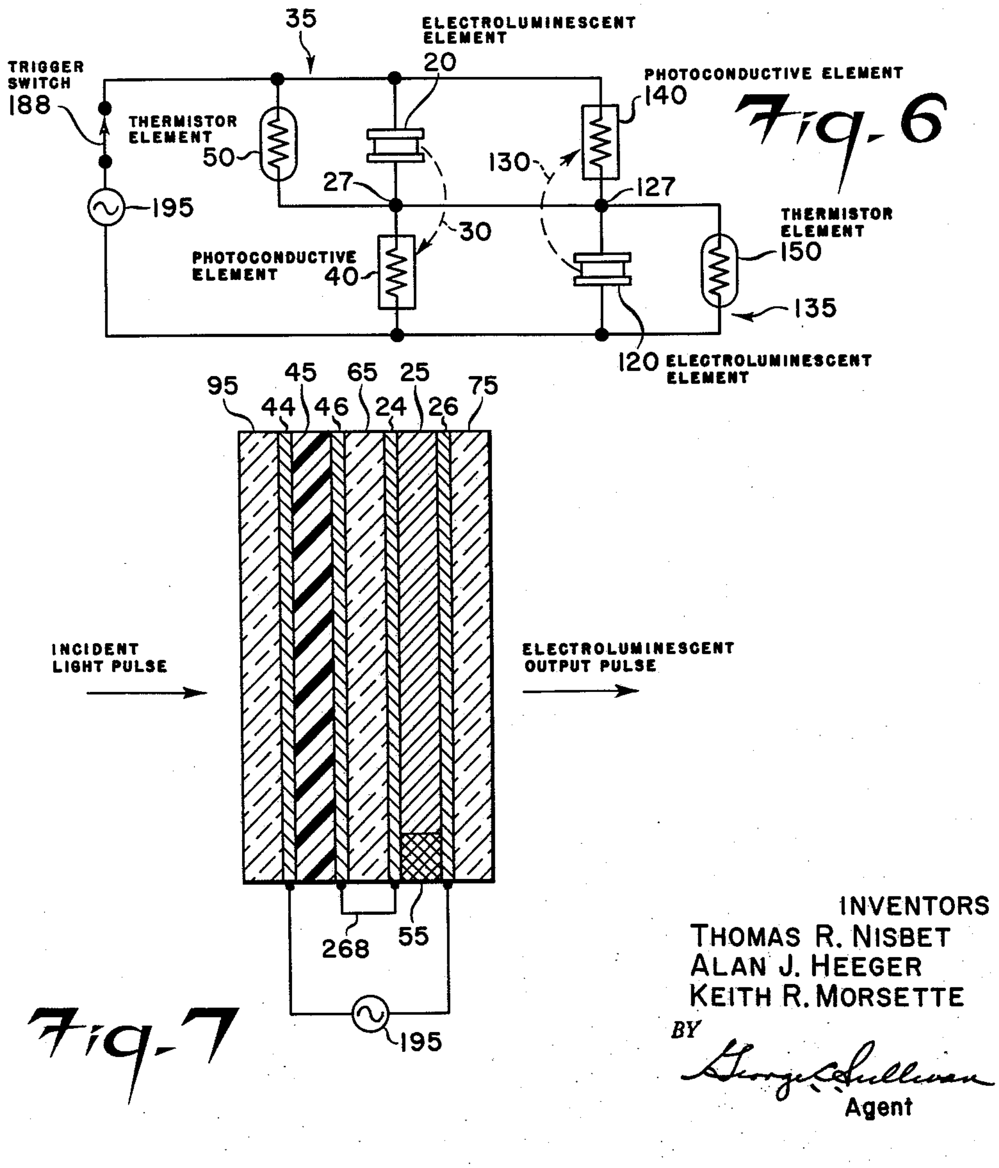
FIGURE 6 is a schematic and circuit diagram of an optical flip-flop circuit, in accordance with the invention.
FIGURE 7 is a diagrammatic and cross-sectional view of a preferred electroluminescent, photoconductive and thermistor element construction, in accordance with the invention.

Another advantageous combination of electroluminescent, photoconductive and thermistor elements in accordance with the invention is shown by the optical flip-flop circuit of FIGURE 6. It can be seen that the circuit of FIGURE 6 has a first element arrangement 35 which is the same as that of FIGURE 2, in which the photoconductive element 40 is optically coupled to the electroluminescent element 20 and electrically in series with the parallel combination of electroluminescent and thermistor elements 20 and 50, the energizing voltage source 195 being applied across the element arrangement so formed. In addition, the circuit of FIGURE 6 preferably has a substantially identical second element arrangement 135 of electroluminescent, photoconductive and thermistor elements 120, 140, and 150, with optical coupling 130 between the electroluminescent and photoconductive elements 120 and 140, connected in reverse order across the source 195, as shown. A trigger switch 188, which may be either mechanical or electronic, is connected in series with the energization voltage source 195. Thus, the photoconductive element 40 is in parallel with the electroluminescent and thermistor elements 120 and 150. The common junctions 27 and 127 of the arrangements 20, 40, 50 and 120, 140, 150, respectively, are connected together.

The following description and explanation of the circuit of FIGURE 6 is now presented, from which those skilled in the art will readily be able to choose the characteristics of the electroluminescent, photoconductive and thermistor elements which will provide optical flip-flop operation.

As mentioned previously, the first and second element arrangements 35 and 135 are preferably substantially identical with corresponding elements having substantially the same characteristics. The optical coupling between the electroluminescent and photoconductive elements of each arrangement, as indicated by the dashed arrows 30 and 130, is made sufficiently large so that each arrangement operates bistably; that is, the electroluminescent elements 20 and 120 will either be "on" or "off." Each arrangement is then designed so that if it alone were connected across the source 195, its electroluminescent element would be "on" and remain "on" even when the thermistor element in parallel therewith heats up and the impedance thereof correspondingly decreases to establish a new equilibrium condition. This operation, therefore, is different from that of the circuits of FIGURES 2 and 5, in which the impedance of the thermistor element eventually decreases to a sufficient extent as a result of its being heated so that the electroluminescent element turns "off."

Each of the element arrangements 35 and 135 are also designed so that when an electroluminescent element is "on," its optically-coupled photoconductive element has an impedance which is very much smaller than the impedance of the parallel combination of electroluminescent and thermistor elements, regardless of whether the electroluminescent element of the parallel combination is "on" or "off"; and when an electroluminescent element is "off," the resulting dark impedance of its photoconductive element is very much greater than the impedance of the parallel electroluminescent and thermistor elements, regardless of whether the electroluminescent element of the parallel combination is "on" or "off." It will be evident to those skilled in the art, that the relation of impedances just described can readily be provided with presently available materials.

From the foregoing considerations, it will now be understood that if the electroluminescent element 20 is "on," its photoconductive element 40 will effectively short out the electroluminescent element 120, preventing it from turning "on." Likewise, if the electroluminescent element 120 is "on" its photoconductive element 140 will effectively short out the electroluminescent element 20, preventing it from turning "on." Thus, in the circuit of FIGURE 6, only one electroluminescent element, either 20 or 120, can be "on" at one time. The FIGURE 6 circuit, therefore, will have two stable states in which it may rest.

Considering now the thermistors 50 and 150, which are chosen to have negative temperature coefficients of resistivity, it will be evident that the thermistor element whose parallel electroluminescent element is "on" will be at a higher temperature than the thermistor element whose parallel electroluminescent element is "off." The impedance of the parallel combination including the lower temperature thermistor element will therefore be greater than the impedance of the parallel combination including the higher temperature thermistor element.

If the trigger switch 188 in series with the source 195 is now momentarily opened for a predetermined time which is long enough to permit the photoconductive element of the "on" electroluminescent element to return to its high dark impedance value, but not long enough for the more slowly responsive thermistor elements to cool, then upon closing the switch 188, the energizing voltage will divide across the electroluminescent elements in a proportion determined partly by the relative impedance of the thermistor elements. Since the thermistor element across the "on" electroluminescent element has a lower impedance than the impedance of the thermistor element across the "off" electroluminescent element, the initial voltage appearing across the previously "off" electroluminescent element when the switch 188 is closed will be higher than the voltage appearing across the previously "on" electroluminescent element. This difference in voltage is caused to be of sufficient magnitude so that the closing of the switch 188 results in turning the previously "off" electroluminescent element "on," the previously "on" electroluminescent element thereby remaining "off."

It will thus be evident that the circuit of FIGURE 6 acts as an optical flip-flop circuit which is triggered from one state to the other by momentarily opening the switch 188 for a predetermined time. Instead of using a switch 188 to trigger the circuit, it is also possible to cause triggering by simultaneously illuminating both photoconductive elements for the same predetermined time. Also, it will be apparent that, although convenient, it is not essential that the first and second element arrangements 35 and 135 be identical.

In a typical embodiment of the circuit of FIGURE 6, the electroluminescent and photoconductive elements of each arrangement and the optical coupling therebetween are the same as in the typical embodiments of FIGURES 2 and 5. The thermistor elements 50 and 150 have a resistance of 200,000 ohms at 25° centigrade, a dissipation constant of 5 milliwatts per degree centigrade, a temperature coefficient of −4% per degree centigrade at 25°, and a thermal constant of 20 seconds. The A.-C. voltage source 195 has a voltage of 250 volts R.M.S. at 1,000 cycles per second. Momentarily removing the A.-C. voltage for a time from one to 10 seconds is sufficient to cause a change in the state of the circuit.

It will be apparent to those skilled in the art that the construction and arrangement of electroluminescent, photoconductive and thermistor elements which will exhibit the type of operation described in connection with the above described circuits shown in the drawing can readily be provided in a variety of ways, based on presently available techniques. Although commercially available elements have been illustrated in the typical circuit embodiments given herein, it is also possible to provide other arrangements and constructions. A preferable three-element electroluminescent, photoconductive and thermistor laminated construction is shown in FIGURE 7. In this construction, a middle glass lamination 65 has transparent electrodes 46 and 24 deposited on opposite sides thereof. One side of a layer of electroluminescent material 25 is placed adjacent and in contact with the transparent electrode 24 and one side of a layer of photoconductive material 45 is placed adjacent and in contact with the transparent electrode 46.

An end glass lamination 95 having a transparent electrode 44 deposited on one side thereof is placed with its transparent electrode 44 adjacent and in contact with the other side of the photoconductive layer 45. Likewise, an end glass lamination 75 having a transparent electrode 26 deposited on one side thereof is placed with its transparent electrode adjacent and in contact with the other side of the electroluminescent layer 25.

The electroluminescent and photoconductive materials 25 and 45 are connected in series by electrically connecting the transparent electrodes 24 and 46 by any suitable means, such as the wire 268 soldered thereto. If desired, the wire lead 268 can also be used as a connection point for the oscillatory impedance 60 in the circuit of FIGURE 5. Also, an energizing voltage source 195 may be connected across the 3-element construction by soldering leads to the transparent electrodes 26 and 44.

The thermistor element shown in the figures of the drawing may now be most conveniently and compactly provided by substituting for a portion of the electroluminescent material 25 between the transparent electrodes 24 and 26, an appropriate amount of thermistor material chosen to provide the desired characteristics of operation for the particular circuit in which it is to be used. In FIGURE 7, a portion of the electroluminescent material 25 is removed at the lower edge and the thermistor material 55 suitably substituted therefor. It is well known that thermistor materials may be provided in a variety of forms and arrangements so that the provision of the thermistor material 55 between the lower edge of the two transparent electrodes 24 and 26, as shown in the construction of FIGURE 7, is well within the skill presently available in the art.

It should be realized that a thermistor element need not be integrally provided as shown in FIGURE 7. If desired, a suitable thermistor component may merely be connected between the transparent electrodes 24 and 26.

Incident radiation is applied to the photoconductive material 45 in the construction of FIGURE 7 through the glass lamination 95 and its transparent electrode 44. In those circuits where no incident radiation is necessary or desired, such as in the oscillatory circuit of FIGURE 5, the glass lamination 95 may be made opaque. Optical coupling between the photoconductive and electroluminescent materials 45 and 25 is obtained through the glass lamination 65 and its transparent electrodes 46 and 24. If no optical coupling is desired, or if it is desired to reduce the optical coupling, the glass lamination 65 may be made opaque or partially opaque.

It will be apparent to those skilled in the art that various modifications and variations can be made in the embodiments shown in the drawing without departing from the scope of this invention. For example, a D.-C. energizing source could be used for the A.-C. source 195 if a suitable D.-C. electroluminescent phosphor is used. It will also be apparent that the circuits shown in the drawing may be modified to form a variety of electrically equivalent arrangements.

It is to be understood, therefore, that this invention is intended to include any and all variations in construction and arrangement which may be made in the embodiments described herein which are within the scope of the invention as defined in the appended claims.

We claim as our invention:

1. A combined optical and electronic circuit including an electroluminescent element, a thermistor element in parallel with said electroluminescent element, a photoconductive element in series with the parallel combination of said electroluminescent and thermistor elements, and means applying an energization voltage to said circuit.

2. The invention in accordance with claim 1, wherein said photoconductive and electroluminescent elements are constructed and arranged so as to provide optical coupling therebetween.

3. The invention in accordance with claim 2, wherein the optical coupling between said electroluminescent and photoconductive elements is chosen in conjunction with said means to produce bistable operation of said circuit.

4. The invention in accordance with claim 1, wherein the circuit connections are chosen in conjunction with the characteristics of said thermistor element so that when said electroluminescent element becomes sufficiently luminescent an increased voltage appears across said thermistor element which causes it to heat up and decrease its impedance by an amount which substantially extinguishes the light output from said electroluminescent element.

5. A combined optical and electronic circuit including an electroluminescent element, a thermistor element in parallel with said electroluminescent element, a photoconductive element in series with the parallel combination of said electroluminescent and thermistor elements and optically coupled to said electroluminescent element by an amount which is sufficiently large to produce bistable operation thereof, and means applying an energization voltage to said circuit.

6. In a combined optical and electronic circuit having an electroluminescent element and a photoconductive element connected in series with said electroluminescent element and optically coupled thereto by an amount which produces bistable operation thereof, the improvement comprising a thermistor element connected in parallel with said electroluminescent element, said thermistor element having characteristics chosen in conjunction with the characteristics of said circuit so that when said electroluminescent element is "on," the increased voltage thereby appearing across said thermistor element causes it to heat up and decrease its impedance by an amount which turns said electroluminescent element "off."

7. An optical differentiating circuit comprising an electroluminescent element, thermistor element in parallel with said electroluminescent element, a photoconductive element connected in series with the parallel combination of said electroluminescent and thermistor elements, and means applying an energizing voltage to said circuit, said elements being constructed and arranged in conjunction with said energizing voltage so that the application of a predetermined level of incident radiation of non-critical duration to said photoconductive element causes said electroluminescent element which is initially dark to become luminescent whereupon the increased voltage thereby appearing across said thermistor element causes it to heat up and decrease in impedance by an amount which returns said electroluminescent element to a dark condition, thereby producing an electroluminescent output pulse of predetermined duration in response to said incident radiation of non-critical duration.

8. An optical pulse-stretching circuit comprising an electroluminescent element, a thermistor element in parallel with said electroluminescent element, a photoconductive element in series with the parallel combination of said electroluminescent and thermistor elements and optically coupled to said electroluminescent element by an amount which produces bistable operation thereof, and means applying an energizing voltage to said circuit, said elements being constructed and arranged in conjunction with said energizing voltage so that the application of a pulse of incident radiation having a predetermined level to said photoconductive element causes said electroluminescent element which is initially "off" to turn "on" whereupon the increased voltage thereby appearing across said thermistor element causes it to heat up and decrease in impedance by an amount which turns said electroluminescent element "off," the time constant of said thermistor element being chosen sufficiently long to provide an electroluminescent output pulse having a duration which is greater than the duration of the incident radiation pulse.

9. An optical oscillator comprising an electroluminescent element, a thermistor element in parallel with said electroluminescent element, a photoconductive element in parallel with the parallel combination of said electroluminescent and thermistor elements and optically coupled to said electroluminescent element by an amount which produces bistable operation thereof, means applying an energizing voltage to said circuit, and means applying a continuous incident radiation above a predetermined level to said photoconductive element, said elements being constructed and arranged in conjunction with said energizing voltage and said incident radiation so that said thermistor element acts to periodically turn said electroluminescent element "on" and "off," thereby producing periodic electroluminescent output pulses.

10. An optical oscillator comprising an electroluminescent element, a thermistor element in parallel with said electroluminescent element, a photoconductive element in series with the parallel combination of said electroluminescent and thermistor elements and optically coupled to said electroluminescent element by an amount which produces bistable operation thereof, means applying an energizing voltage to said circuit, and an oscillatory impedance in parallel with said photoconductive element, said elements being constructed and arranged in conjunction with said energizing voltage and said oscillatory impedance so that said thermistor element acts to periodically turn said electroluminescent element "on" and "off" thereby producing periodic electroluminescent output pulses.

11. An optical flip-flop circuit comprising first and second electroluminescent, photoconductive and thermistor element arrangements, each arrangement having an electroluminescent element, a thermistor element in parallel with said electroluminescent element and a photoconductive element connected in series with the parallel combination of said electroluminescent and thermistor elements and optically coupled to said electroluminescent element by an amount which is large enough to produce bistable operation thereof, an energizing voltage source, said first and second element arrangements being connected in opposite order across said source so that the photoconductive element of said first arrangement is in parallel with the electroluminescent and thermistor elements of said second arrangement and the photoconductive element of said second arrangement is connected in parallel with the electroluminescent and thermistor elements of said first arrangement, said first and second arrangements being constructed and arranged in conjunction with the energizing voltage from said source so that only one electroluminescent element can be "on" at a time, the other electroluminescent element being "off," said circuit thereby having two states in which it can reside depending upon which electroluminescent element is "on," and external means applied to said circuit for maintaining both electroluminescent elements "off" for a predetermined time, the thermistor elements of said arrangements being chosen so that when both electroluminescent elements are no longer maintained "off" the thermistor elements act to cause the previously "off" electroluminescent element to be turned "on" and the previously "on" electroluminescent element to remain "off."

12. The invention in accordance with claim 11 wherein said external means is a switch in series with said source.

13. An electroluminescent, photoconductive and thermistor element construction comprising: a middle glass lamination having transparent electrodes deposited on opposite sides thereof, a layer of electroluminescent material having one side adjacent and in contact with one of the transparent electrodes of said middle glass lamination, a layer of photoconductive material having one side adjacent and in contact with the other transparent electrode of said middle glass lamination, a first end glass lamination having a transparent electrode deposited on one side thereof placed with its transparent electrode adjacent and in contact with the other side of said photoconductive layer, a second end glass lamination having a transparent electrode deposited on one side thereof placed with its transparent electrode adjacent and in contact with the other side of said electroluminescent layer, and a portion of thermistor material interposed between the same transparent electrodes as said electroluminescent layer is interposed so as to be effectively connected in parallel therewith.

14. An integral electroluminescent and thermistor element construction comprising two spaced electrodes and electroluminescent and thermistor material interposed between said electrodes.

References Cited in the file of this patent

UNITED STATES PATENTS

| | | |
|---|---|---|
| 2,907,001 | Loebner | Sept. 29, 1959 |
| 2,939,029 | Wahlig | May 31, 1960 |